(12) United States Patent
Kamp et al.

(10) Patent No.: US 8,693,543 B2
(45) Date of Patent: Apr. 8, 2014

(54) INTER-FRAME PREDICTION CODING METHOD, DEVICE AND SYSTEM

(75) Inventors: Steffen Kamp, Aachen (DE); Mathias Wein, Aachen (DE); Lianhuan Xiong, Shenzhen (CN); Yingjia Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 624 days.

(21) Appl. No.: 12/830,877

(22) Filed: Jul. 6, 2010

(65) Prior Publication Data
US 2010/0272183 A1 Oct. 28, 2010

Related U.S. Application Data

(63) Continuation of application No. PCT/CN2009/071224, filed on Apr. 10, 2009.

(30) Foreign Application Priority Data

Apr. 11, 2008 (CN) .......................... 2008 1 0089318

(51) Int. Cl.
*H04N 7/50* (2006.01)
(52) U.S. Cl.
USPC ............ 375/240.16; 375/240.12; 375/240.13; 375/E7.243; 375/E7.125; 375/E7.104
(58) Field of Classification Search
USPC .......................................................... 375/240
See application file for complete search history.

(56) References Cited

U.S. PATENT DOCUMENTS 6,636,565 B1 10/2003 Kim
6,807,231 B1 10/2004 Wiegand et al.
(Continued)

FOREIGN PATENT DOCUMENTS

CN  1655618 A  8/2005
CN  1977539 A  6/2007
(Continued)

OTHER PUBLICATIONS

Thiow Keng Tan et al: "Intra Prediction by Averaged Template Matching Predictors", Consumer Communications and Networking Conference, 2007. CCNC 2007. 20 07 4th IEEE, IEEE, PI, Jan. 1, 2007, pp. 405-409, XP031087817, ISBN: 978-1-4244-0667-8.*

(Continued)

*Primary Examiner* — Christopher S Kelley
*Assistant Examiner* — Asmamaw G Tarko
(74) *Attorney, Agent, or Firm* — Leydig, Voit & Mayer, Ltd.

(57) ABSTRACT

Inter-frame prediction coding method, device and system are provided. The inter-frame prediction coding method includes: calculating distortions between a template area of current encoding block and each of M matching templates in L reference frames, to determine M offset vectors; acquiring M hypothesis prediction values of the encoding block to which the M matching templates correspond according to the determined M offset vectors, and calculating the template matching prediction value of the current encoding block according to the M hypothesis prediction values; comparing the template matching prediction value and original value of the current encoding block to acquire the residual of the current encoding block, and encoding the residual. The technical solution improves prediction performance of the video coding system and increases coding efficiency.

22 Claims, 3 Drawing Sheets

(56) References Cited

U.S. PATENT DOCUMENTS

| | | | |
|---|---|---|---|
| 7,974,340 B2* | 7/2011 | Xia et al. | 375/240.03 |
| 7,995,649 B2* | 8/2011 | Zuo et al. | 375/240.03 |
| 8,243,797 B2* | 8/2012 | Lin et al. | 375/240.05 |
| 2009/0116759 A1* | 5/2009 | Suzuki et al. | 382/238 |
| 2010/0191517 A1 | 7/2010 | Blundell et al. | 703/11 |
| 2010/0208814 A1* | 8/2010 | Xiong et al. | 375/240.13 |
| 2011/0176611 A1* | 7/2011 | Huang et al. | 375/240.16 |
| 2011/0206135 A1* | 8/2011 | Drugeon et al. | 375/240.24 |

FOREIGN PATENT DOCUMENTS

| | | |
|---|---|---|
| CN | 101022555 A | 8/2007 |
| CN | 101094404 A | 12/2007 |
| CN | 101557514 B | 2/2011 |
| EP | 1919223 A1 | 5/2008 |
| JP | 2008-0019294 A | 8/2008 |
| KR | 20080019294 A | 3/2008 |
| WO | WO 2007004678 A1 | 1/2007 |
| WO | WO 2007/125856 A1 | 11/2007 |

OTHER PUBLICATIONS

Written Opinion of the International Searching Authority in corresponding PCT Application No. PCT/CN2009/071224 (Jul. 23, 2009).

International Search Report in corresponding PCT Application No. PCT/JP2006/313416 (Oct. 17, 2006).

Extended European Search Report in corresponding European Application No. 09730278.0 (Mar. 9, 2011).

Tan et al., "Intra Prediction by Averaged Template Matching Predictors," 2007, Institute of Electrical and Electronics Engineers, New York, New York.

Sukuki et al., "Inter Frame Coding With Template Matching Averaging," 2007, Institute of Electrical and Electronics Engineers, New York, New York.

Kamp et al., "Decoder Side Motion Vector Derivation with Multiple Reference Pictures," Study Group 16 Question 6, Jan. 12-13, 2008, International Telecommunication Union, Antalya, Turkey.

State Intellectual Property Office of the People's Republic of China, International Search Report in International Patent Application No. PCT/CN2009/071224 (Jul. 23, 2009).

Kamp et al., "Decoder-Side MV Derivation with Multiple Reference Pictures," Institut Für Nachrichtentechnik RWTH Aachen University, VCEG-AH15.pdf.

Kamp et al., "Decoder Side Motion Vector Derivation," Institut Für Nachrichtentechnik RWTH Aachen University, VCEG-AG16.pdf.

Excel Spreadsheet for VCEG-AG16.

Excel Spreadsheet for VCEG-AH15.

Excel Spreadsheet for VCEG-AH15r1.

Office Action in corresponding European Patent Application No. 09730278.0 (May 9, 2012).

Decision of Refusal in corresponding Japanese Patent Application No. 2010-544567 (Aug. 7, 2012).

Rejection Decision in corresponding Japanese Application No. 2010-544567 (Jan. 5, 2012).

Notice to Submit a Response in corresponding Korean Application No. 2010-7016370 (Jan. 20, 2012).

Tan et al., "Intra Prediction by Average Template Matching Predictors," IEEE, 2007, NTT Docomo, Inc., Japan.

International Telecommunication Union (ITU), "Conformance Specification for H.264 Advanced Video Coding," Series H: Audiovisual and Multimedia Systems, Infrastructure of Audiovisual Services—Coding of Moving Video, H.264.1 (Mar. 2005).

Girod, "Efficiency Analysis of Mutlihypothesis Motion-Compensated Prediction for Video Coding," IEEE Transactions on Image Processing, vol. 9, No. 2, pp. 173-183 (Feb. 2000).

ITU—Telecommunications Standardization Sector, "Decoder Side Motion Vector Derivation," Study Group 16 Question 6, Video Coding Experts Group (VCEG), Document: VCEG-AG16, Filename: VCEG-AG16.doc, 33$^{rd}$ Meeting: Shenzhen, China (Oct. 20, 2007).

ITU—Telecommunications Standardization Sector, "Decoder Side Motion Vector Derivation with Multiple Reference Pictures," Study Group 16 Question 6, Video Coding Experts Group (VCEG), Document: VCEG-AH15, Filename: VCEG-AH15.doc, 34$^{th}$ Meeting: Antalya, Turkey (Jan. 12-13, 2008).

ITU—Telecommunications Standardization Sector, "Decoder Side Motion Vector Derivation with Multiple Reference Pictures," Study Group 16 Question 6, Video Coding Experts Group (VCEG), Document: VCEG-AH15r1, Filename: VCEG-AH15r1.doc, 34$^{th}$ Meeting: Antalya, Turkey (Jan. 12-13, 2008).

Kamp et al., "Decoder-Side MV Derivation with Multiple Reference Pictures," Institut Für Nachrichtentechnik RWTH Aachen University, VCEG-AH15.pdf, (Jan. 2008).

Kamp et al., "Decoder Side Motion Vector Derivation," Institut Für Nachrichtentechnik RWTH Aachen University, VCEG-AG16.pdf, (Oct. 2007).

\* cited by examiner

INTER-FRAME PREDICTION CODING METHOD, DEVICE AND SYSTEM

CROSS-REFERENCE TO RELATED APPLICATIONS

This application is a continuation of International Application No. PCT/CN2009/071224, filed on Apr. 10, 2009, which claims priority to Chinese Patent Application No. 200810089318.6, filed on Apr. 11, 2008, both of which are hereby incorporated by reference in their entireties.

FIELD OF THE INVENTION

Embodiments of the present invention relate to the technical field of communications, and more particularly, to inter-frame prediction coding method, device and system.

BACKGROUND

In video coding, inter-frame motion compensation prediction is of great importance for improving compressive performance. The technology of inter-frame motion compensation prediction is mainly to search for the motion vector information that most precisely matches the current coding block in reference frame and the motion vector information of the current coding block occupies a significant amount of bits in the code stream of an inter coding frame. The motion vector information is usually generated and encoded into the code stream at an encoder, and then a decoder performs motion compensation prediction on the current decoding block according to the decoded motion vector information. Inter-frame prediction technology based on motion compensation is employed in current principal video coding standards, such as Advanced Video Coding (H.264/AVC) Audio Video Coding Standard (AVS), and Scalable Video Coding (H.264 SVC).

In H.264/AVC, inter-frame prediction is to obtain the predictor for the current coding block by combining the motion vector information decoded from the code stream with the information of the corresponding region of decoded frame. The motion vector information is obtained at the encoder by using a nonstandard motion estimation algorithm. In H.264/AVC, a bidirectional coding makes uses of composite hypothesis predictions to obtain the average value of two motion compensation predictors as the final prediction value.

H.264/AVC explicitly requires that the motion vector information must be written into the code stream, and even in the case that signal characteristics allow the decoder to deduce motion vector parameters, it is required that the motion vector information must be encoded in the code stream at the encoder, thus increasing bits of code stream.

A conventional method proposes an inter coding method based on H.264/AVC template matching. The method introduces new types of Macroblock and sub-Macroblock to identify whether template matching prediction should be used. This method improves the coding efficiency by averaging a plurality of prediction reference signals, in which the number of the prediction reference signals used is determined with a threshold obtained by calculating template matching cost distortion.

When multi-hypothesis prediction is used, the preceding method obtains the final prediction value by averaging hypothesis prediction values derived from one reference frame, so that both the prediction performance and the coding efficiency are relatively low. Moreover, the averaging method as used is to calculate the arithmetic average value of the hypothesis prediction values. Because calculation of the arithmetic average value is a floating point computation, the great amount of decimal computation renders implementation of software and hardware complicated.

SUMMARY

Embodiments of the present invention provide a method, device, and system for inter-frame prediction encoding and decoding, to obtain a plurality of hypothesis prediction values with distortions between a template region of the current coding block and a plurality of matching templates in a plurality of reference frames and calculate the template matching prediction values of the current coding block. Therefore, the prediction performance and the coding efficiency are enhanced.

To achieve the preceding objects, one aspect of the embodiments of the present invention provides an inter-frame prediction encoding method, which includes: calculating distortions between a template region of a current encoding block and each of M matching templates in L reference frames to determine M offset vectors; obtaining M hypothesis prediction values to which the M matching templates correspond according to the M determined offset vectors, and calculating a template matching prediction value of the current encoding block according to the M hypothesis prediction values; and comparing the template matching prediction value with an original value of the current encoding block, obtaining a residual of the current encoding block, and encoding the residual; where L and M are natural numbers greater than 1.

According to another aspect, an embodiment of the present invention provides an inter-frame prediction decoding method, which includes: calculating distortions between a template region of a current decoding block and each of M matching templates in L reference frames to determine M offset vectors; obtaining M hypothesis prediction values of the decoding block to which the M matching templates correspond according to the M determined offset vectors, and calculating a template matching prediction value of the current decoding block according to the M hypothesis prediction values; and decoding a residual of the current decoding block, and adding the decoded residual of the current decoding block to the template matching prediction value of the current decoding block to obtain a reconstruction value of the current decoding block; where L and M are natural numbers greater than 1.

According to another aspect, an embodiment of the present invention provides an inter-frame prediction encoding device, which includes: a vector determining module configured for calculating distortions between a template region of a current encoding block and each of M matching templates in L reference frames to determine M offset vectors; a prediction value calculating module configured for obtaining M hypothesis prediction values of the encoding block to which the M matching templates correspond according to the M offset vectors determined by the vector determining module, and calculating a template matching prediction value of the current encoding block according to the M hypothesis prediction values; and an encoding module configured for comparing the template matching prediction value with an actual value of the current encoding block after the prediction value calculating module calculates the template matching prediction value of the current encoding block, obtaining a residual of the current encoding block, and encoding the residual; where L and M are natural numbers greater than 1.

According to another aspect, an embodiment of the present invention provides an inter-frame prediction decoding device, which includes: a vector determining module configured for calculating distortions between a template region of a current decoding block and each of M matching templates in L reference frames to determine M offset vectors; a prediction value calculating module configured for obtaining M hypothesis prediction values of the decoding block to which the M matching templates correspond according to the M offset vectors determined by the vector determining module, and calculating a template matching prediction value of the current decoding block according to the M hypothesis prediction values; and a decoding module configured for decoding a residual of the current decoding block, and adding the decoded residual of the current decoding block to the template matching prediction value of the current decoding block to obtain a reconstruction value of the current decoding block; where L and M are natural numbers greater than 1.

According to another aspect, an embodiment of the present invention provides an inter-frame prediction encoding system, which includes: an inter-frame prediction encoding device configured for calculating distortions between a template region of a current encoding block and each of M matching templates in L reference frames with a cost function to determine M offset vectors, obtaining M hypothesis prediction values of the encoding block to which the M matching templates correspond according to the M determined offset vectors, calculating a template matching prediction value of the current encoding block according to the M hypothesis prediction values, comparing the template matching prediction value with an actual value of the current encoding block, obtaining a residual of the current encoding block, and encoding the residual; where L and M are natural numbers greater than 1.

According to another aspect, an embodiment of the present invention provides an inter-frame prediction decoding system, which includes: an inter-frame prediction decoding device configured for calculating distortions between a template region of a current decoding block and each of M matching templates in L reference frames with a cost function to determine M offset vectors, obtaining M hypothesis prediction values of the decoding block to which the M matching templates correspond according to the M determined offset vectors, calculating a template matching prediction value of the current decoding block according to the M hypothesis prediction values, decoding a residual of the current decoding block, and adding the decoded residual of the current decoding block to the template matching prediction value of the current decoding block to obtain a reconstruction value of the current decoding block; where L and M are natural numbers greater than 1.

Embodiments of the present invention possess the following advantages as compared with the conventional methods. Embodiments of the present invention obtain a plurality of hypothesis prediction values of encoding/decoding block to which a plurality of matching templates corresponds by calculating distortions between the template region of the current encoding/decoding block and the plurality of matching templates in a plurality of reference frames, and calculate the template matching prediction value of the encoding/decoding block according to the plurality of hypothesis prediction values, to thereby enhance the prediction performance of video coding, and enhance the coding efficiency.

DETAILED DESCRIPTION

Figure 1:
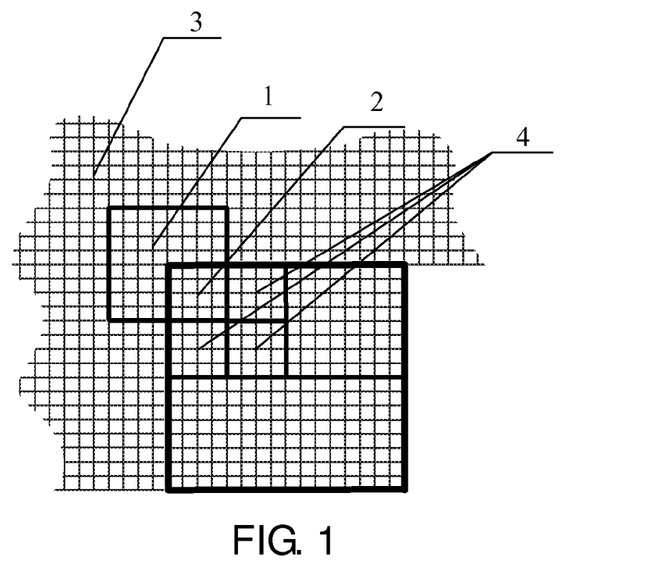
FIG. 1 is a schematic view illustrating template matching parameters according to an embodiment of the present invention.

Embodiments of the present invention employ a template matching algorithm to generate hypothesis prediction values for a square region of R×R pixels. As shown in FIG. 1, a template is defined in an encoded and decoded block adjacent to a current coding block. In FIG. 1, the region indicated by the reference numeral 1 is a template region, the region indicated by the reference numeral 2 is the current coding block, the region indicated by the reference numeral 3 is a coded block, namely a reconstructed region, and the region indicated by reference numeral 4 is a block to be coded.

Figure 2:
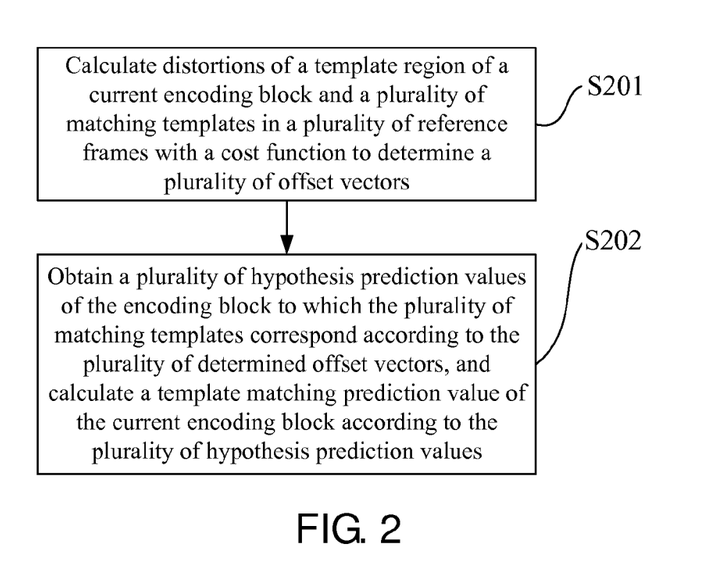
FIG. 2 is a flowchart illustrating an inter-frame prediction encoding method according to an embodiment of the present invention.

FIG. 2 is a flowchart illustrating an inter-frame prediction encoding method according to an embodiment of the present invention; the method includes the following steps.

Step S201: Calculate distortions between a template region of a current encoding block and a plurality of matching templates in a plurality of reference frames with a cost function to determine a plurality of offset vectors, where the plurality of matching templates is obtained by searching in the plurality of reference frames. The searching location can be a set of all reference frames (multiple frames) or a single reference frame (for instance, the reference frame in which the optimum template is located), and the searching location can also be a reference frame to which the preset encoding offset vector information and/or reference frame serial number correspond. In an embodiment of the present invention, the location for searching the plurality of matching templates is a set of all reference frames (multiple frames).

The distortions between the template region of the current encoding block and the plurality of matching templates in the plurality of reference frames are a difference between the prediction value of the current encoding block and the real value of the current encoding block. The real value of the current encoding block is the original value of the current encoding block, namely the pixel value before encoding, and the prediction value of the current encoding block is a prediction value for the pixel before encoding. The offset vectors are the location differences between the template region of the current encoding block and the matching templates in the reference frames, and the distortion between the template region of the current encoding block and each matching template in each reference frame corresponds to one offset vector, so that it is possible to determine a plurality of offset vectors by the distortions between the template region of the current encoding block and the plurality of matching templates in the plurality of reference frames. Specifically, a plurality of matching templates might be found for each reference frame, so that it is possible to determine M offset vectors by the distortions between the template region of the current encoding block and each of M matching templates in L reference frames, where L and M are natural numbers greater than 1.

As shown in FIG. 1, the distortions between the template region of the current encoding block and the plurality of matching templates in the plurality of reference frames is calculated with a proposed cost function to determine a plurality of offset vector, where the cost function is a sum of absolute values of the pixel value differences between the template region and corresponding regions in the reference frames. It is also possible to use other cost functions, for instance, a sum of squares of the pixel value differences between the template region and corresponding regions in the reference frames. The corresponding regions in the reference frames are those regions that are found in the reference frames according to the location of the template region and match the template region.

Step S202: Obtain a plurality of hypothesis prediction values of the encoding block to which the plurality of matching templates correspond according to the plurality of determined offset vectors, and calculate a template matching prediction value of the current encoding block according to the plurality of hypothesis prediction values. The hypothesis prediction values are a series of prediction values when multiple predictions are preformed, and the template matching prediction value is a prediction value of the current encoding block obtained by using the template matching technology.

After the plurality of offset vectors is determined, the plurality of offset vectors is arranged by a predetermined order according to the values of the distortions between the template region of the current encoding block and the matching templates, to obtain a subset list $v_n$ independent of the offset vector information of the reference frames. The predetermined order can either be an ascending order or a descending order, and the ascending order is taken as an example in the embodiment of the present invention to make explanation.

Subsequently, a predetermined number of hypothesis prediction values of the encoding block to which matching templates correspond are selected from the list according to an ascending order of distortions of the offset vectors. Specifically, a predetermined number of hypothesis prediction values of the encoding block to which matching templates correspond are selected from the list according to an ascending order of distortions of the preceding M offset vectors. The predetermined number can be N, whose value can be predetermined, with the least value of N being 1. It can be understood that the largest value of N is M. The value of N can also be determined by the distortions between the template region of the current encoding block and the matching templates or the number of the reference frames. For instance, a threshold is set, and the offset vectors, to which the distortions greater than or less than the threshold of the template region of the current encoding block and the matching templates correspond, are selected.

After N hypothesis prediction values are obtained, the N hypothesis prediction values are weighted-averaged, and the value obtained by weighted-averaging the N hypothesis prediction values is the template matching prediction value TM_P of the current encoding block. The template matching prediction value TM_P can also be calculated by averaging in integer precision for pixels. The weighted-averaging method is taken for example in the embodiment of the present invention to make explanation.

Using the weighted-averaging method to calculate the template matching prediction value TM_P can be understood as calculating a sum of products of N hypothesis prediction values of the encoding block to which matching templates correspond and N weighting factors, expressed by the following equation as:

$$\text{TM\_P} = \left(\left(\sum_{n=0}^{N-1} a_n X(v_n)\right) + r\right) >> \log_2 A \tag{1}$$

where $a_n$ is a weighting factor generated according to the cost function, A is an integral power of 2, $A=2^k$, k∈Integers. In addition, A is the sum of all integral weighting factors, namely $$A = \sum_{n=0}^{N-1} a_n.$$

The weighting factor $a_n$ is determined by the distortions between the template region of the current encoding block and the plurality of matching templates in the plurality of reference frames calculated according to the cost function. Moreover, the weighting factor $a_n$ can also be a decimal. X(•) indicates that a pixel value is obtained from a plurality of reference frames by searching in the subset list $v_n$ of the offset vector information, and the obtained pixel value is the hypothesis prediction value of the current encoding block. r represents round-off error, and can be predetermined, usually as 0 or A/2.

After the template matching prediction value TM_P is obtained by calculation, the following steps should be further performed when encoding the information of the current encoding block: comparing the template matching prediction value TM_P with the actual value of the current encoding block, obtaining a residual of the current encoding block, and encoding the obtained residual of the current encoding block. The actual value of the current encoding block is the initial value of the current encoding block, namely the pixel value before encoding.

The inter-frame prediction encoding method as provided by the embodiment of the present invention obtains a plurality of hypothesis prediction values of the encoding block to which a plurality of matching templates correspond according to a plurality of determined offset vectors, weighted-averages the plurality of hypothesis prediction values to determine a template matching prediction value, and encodes the residual of the template matching prediction value and the actual value of the current encoding block, so that it is unnecessary to encode the offset vector information of the current encoding block, thereby reducing the encoding amount and enhancing the encoding efficiency. Moreover, the weighted-averaging is performed in integer calculation, thereby reducing the computational complexity.

Corresponding to the preceding inter-frame prediction encoding method, an embodiment of the present invention further proposes an inter-frame prediction decoding method. The method includes the following: after the template matching prediction value TM_P is obtained by calculation, when the current decoding block is decoded, the residual information to which the current decoding block corresponds is decoded, and is added to the template matching prediction value TM_P to obtain a reconstruction value of the current decoding block. The reconstruction value of the current decoding block is the restored value of the current decoding block, namely the value obtained by adding the residual to the template matching prediction value. When the template matching prediction value TM_P is calculated at a decoder, the searching range of template matching is within a plurality of reference frames with location coordinate of the current decoding block as a center.

The inter-frame prediction decoding method as provided by the embodiment of the present invention obtains a plurality of hypothesis prediction values of the decoding block to which a plurality of matching templates correspond according to a plurality of determined offset vectors, weighted-averages the plurality of hypothesis prediction values to determine a template matching prediction value, decodes the residual information to which the current decoding block corresponds when decoding the current decoding block, and adds the residual information to the determined template matching prediction value to obtain the reconstruction value of the current decoding block. Because the encoder does not encode the offset vectors, it is unnecessary for the decoder to decode the offset vectors, thereby improving the coding efficiency of the decoder.

When the block encoded and/or decoded by using the inter-frame prediction encoding and decoding method as proposed by the embodiment of the present invention includes a plurality of sub-block, each sub-block is encoded/decoded by the decoded residual of the current decoding block encoding/decoding method, and the template region of each sub-block contains a template matching prediction value obtained by using the inter-frame prediction encoding and decoding method as provided by the embodiment of the present invention. At the decoded residual of the current decoding block time, before calculating the template matching prediction value TM_P and encoding/decoding the residual, it might be necessary for the encoder/decoder to predict the entire macroblock, and when the template region of the current encoding/decoding block is incomplete, the template matching prediction value of the encoding/decoding block adjacent to the current encoding/decoding block is used as the reconstruction value, so that the encoding/decoding block adjacent to the current encoding/decoding block becomes a part of the template region of the current encoding/decoding block.

Figure 3:
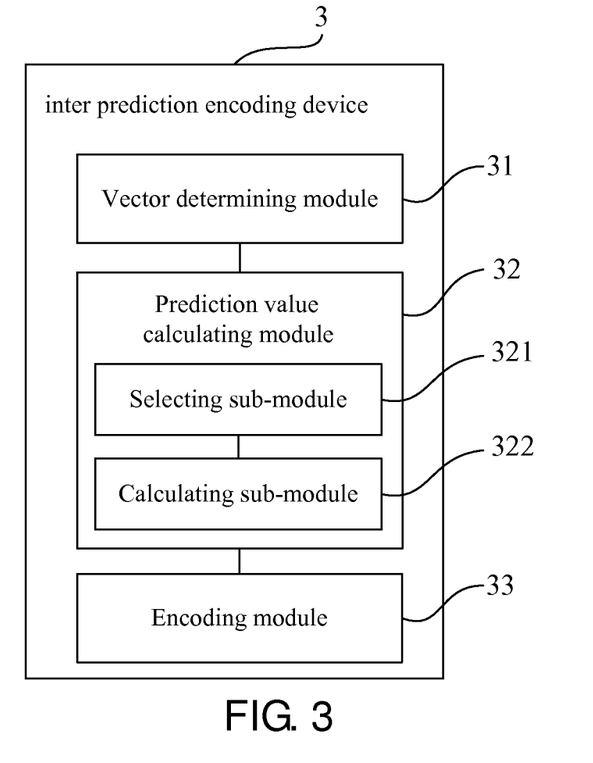
FIG. 3 is a structural view of an inter-frame prediction encoding system according to an embodiment of the present invention.

FIG. 3 is a structural view of an inter-frame prediction encoding system according to an embodiment of the present invention, the inter-frame prediction encoding system includes an inter-frame prediction encoding device 3 that calculates distortions between a template region of a current encoding block and a plurality of matching templates in a plurality of reference frames with a cost function to determine a plurality of offset vectors, obtains a plurality of hypothesis prediction values of the encoding block to which the plurality of matching templates correspond according to the plurality of determined offset vectors, calculates a template matching prediction value of the current encoding block according to the plurality of hypothesis prediction values, compares the template matching prediction value with an actual value of the current encoding block, obtains a residual of the current encoding block, and encodes the residual.

The inter-frame prediction encoding device 3 may include: a vector determining module 31 configured for calculating distortions between a template region of a current encoding block and each of M matching templates in L reference frames, to determine M offset vectors; a prediction value calculating module 32 configured for obtaining M hypothesis prediction values of the encoding block to which the M matching templates correspond according to the M offset vectors determined by the vector determining module, and calculating a template matching prediction value of the current encoding block according to the M hypothesis prediction values; and an encoding module 33 configured for comparing the template matching prediction value with an actual value of the current encoding block after the prediction value calculating module calculates the template matching prediction value of the current encoding block, obtaining a residual of the current encoding block, and encoding the residual; where L and M are natural numbers greater than 1.

The prediction value calculating module 32 may include: a selecting sub-module 321 configured for selecting N hypothesis prediction values from the M hypothesis prediction values; and a calculating sub-module 322 configured for weighted-averaging the N hypothesis prediction values, selected by the selecting sub-module, of the encoding block to which matching templates correspond, to calculate the template matching prediction value of the current encoding block; where N is a natural number less than or equal to M.

In the preceding inter-frame prediction encoding system and inter-frame prediction encoding device 3, the prediction value calculating module 32 obtains a plurality of hypothesis prediction values of the encoding block to which a plurality of matching templates correspond according to a plurality of offset vectors determined by the vector determining module 31, and weighted-averages the plurality of hypothesis prediction values to determine a template matching prediction value; the encoding module 33 encodes the residual of the template matching prediction value and the actual value of the current encoding block, so that it is unnecessary to encode the offset vector information of the current encoding block, thereby reducing the encoding bits and improving the encoding efficiency. Moreover, the prediction value calculating module 32 performs weighted-averaging in integer calculation, thereby reducing the computational complexity.

Figure 4:
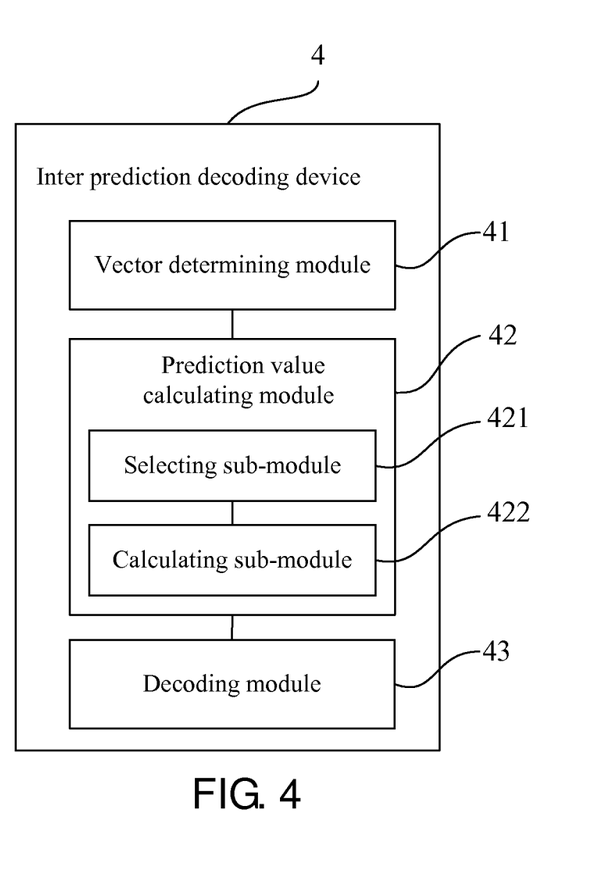
FIG. 4 is a structural view of an inter-frame prediction decoding system according to an embodiment of the present invention.

FIG. 4 is a structural view of an inter-frame prediction decoding system according to an embodiment of the present invention, the inter-frame prediction decoding system includes: an inter-frame prediction decoding device 4 that calculates distortions between a template region of a current decoding block and a plurality of matching templates in a plurality of reference frames with a cost function to determine a plurality of offset vectors, obtains a plurality of hypothesis prediction values of the decoding block to which the plurality of matching templates correspond according to the plurality of determined offset vectors, calculates a template matching prediction value of the current decoding block according to the plurality of hypothesis prediction values, decodes a residual of the current decoding block, and adds the decoded residual of the current decoding block to the template matching prediction value of the current decoding block to obtain a reconstruction value of the current decoding block.

The inter-frame prediction decoding device 4 may include: a vector determining module 41 configured for calculating distortions between a template region of a current decoding block and each of M matching templates in L reference frames, to determine M offset vectors; a prediction value calculating module 42 configured for obtaining M hypothesis prediction values of the decoding block to which the M matching templates correspond according to the M offset vectors determined by the vector determining module, and calculating a template matching prediction value of the current decoding block according to the M hypothesis prediction values; and a decoding module 43 configured for decoding a residual of the current decoding block, and adding the decoded residual of the current decoding block to the template matching prediction value of the current decoding block to obtain a reconstruction value of the current decoding block; where L and M are natural numbers greater than 1.

The prediction value calculating module 42 may include: a selecting sub-module 421 configured for selecting N hypothesis prediction values from the M hypothesis prediction values; and a calculating sub-module 422 configured for weighted-averaging the N hypothesis prediction values, selected by the selecting sub-module, of the decoding block to which matching templates correspond, to calculate the template matching prediction value of the current decoding block; where N is a natural number less than or equal to M.

In the preceding inter-frame prediction decoding system and inter-frame prediction decoding device 4, the prediction value calculating module 42 obtains a plurality of hypothesis prediction values of the decoding block to which a plurality of matching templates correspond according to a plurality of offset vectors determined by the vector determining module 41, and weighted-averages the plurality of hypothesis prediction values to determine a template matching prediction value; the decoding module 43 decodes the residual information to which the current decoding block corresponds while decoding the current decoding block, and adds the residual information to the determined template matching prediction value to obtain the reconstruction value of the current decoding block. Because the encoder does not encode the offset vectors, it is unnecessary for the decoding module 43 to decode the offset vectors, thereby improving the coding efficiency.

By the preceding description of the embodiments, persons skilled in the art should clearly understand that the present invention can be implemented via software plus the necessary general hardware platform, and can of course be implemented via hardware alone, but the former mode is a preferred embodiment under many circumstances. Based on such understanding, the substance of the technical solution of the present invention, or the portion of the invention that makes contribution to the state of the art, can be embodied in the form of a computer software product that is stored in a storage medium and contains plural instructions enabling a computer device which can be a personal computer, a server, a network device, and so on to execute the methods recited in the embodiments of the present invention.

Disclosed above are merely several specific embodiments of the present invention, but the present invention is not restricted thereto, as all modifications conceivable to those skilled in the art should fall within the protection scope of the present invention.

The invention claimed is:

1. An inter-frame prediction encoding method, comprising:
calculating distortions between a template region of a current encoding block and each of M matching templates in L reference frames, to determine M offset vectors;
obtaining M hypothesis prediction values of encoding blocks to which the M matching templates correspond according to the M determined offset vectors, and calculating a template matching prediction value of the current encoding block according to the M hypothesis prediction values; and
comparing the template matching prediction value with an original value of the current encoding block, obtaining a residual of the current encoding block, and encoding the residual;
wherein L and M are natural numbers greater than 1.

2. The inter-frame prediction encoding method according to claim 1, wherein the M matching templates are obtained by searching the L reference frames.

3. The inter-frame prediction encoding method according to claim 1, wherein the step of calculating a template matching prediction value of the current encoding block according to the M hypothesis prediction values comprises:
selecting N hypothesis prediction values from the M hypothesis prediction values; and
calculating the template matching prediction value of the current encoding block according to the selected N hypothesis prediction values;
wherein N is a natural number less than or equal to M.

4. The inter-frame prediction encoding method according to claim 3, wherein the number N is predetermined or determined according to template matching distortion cost or the number of the reference frames.

5. The inter-frame prediction encoding method according to claim 3, wherein the step of calculating the template matching prediction value of the current encoding block according to the selected N hypothesis prediction values comprises:
weighted-averaging the selected N hypothesis prediction values of the encoding block to which the matching templates correspond, to calculate the template matching prediction value of the current encoding block.

6. The inter-frame prediction encoding method according to claim 5, wherein the step of weighted-averaging the selected N hypothesis prediction value comprises:
calculating a sum of products of the selected N hypothesis prediction values of the encoding block to which the matching templates correspond and N weighting factors.

7. The inter-frame prediction encoding method according to claim 6, wherein the weighting factors are determined by distortions between the template region of the current encoding block and each of the N matching templates in the L reference frames calculated according to a cost function.

8. The inter-frame prediction encoding method according to claim 1, further comprising: when the template region of the current encoding block is incomplete, using a template matching prediction value of an encoding block adjacent to the current encoding block as a reconstruction value, so that the encoding block adjacent to the current encoding block becomes a part of the template region of the current encoding block.

9. An inter-frame prediction decoding method, comprising:
calculating distortions between a template region of a current decoding block and each of M matching templates in L reference frames, to determine M offset vectors;
obtaining M hypothesis prediction values of the decoding block to which the M matching templates correspond according to the M determined offset vectors, and calculating a template matching prediction value of the current decoding block according to the M hypothesis prediction values; and
decoding a residual of the current decoding block, and adding the decoded residual of the current decoding block to the template matching prediction value of the current decoding block to obtain a reconstruction value of the current decoding block;
wherein L and M are natural numbers greater than 1.

10. The inter-frame prediction decoding method according to claim 9, wherein the M matching templates are obtained by searching the L reference frames.

11. The inter-frame prediction decoding method according to claim 9, wherein the step of calculating a template matching prediction value of the current decoding block according to the M hypothesis prediction values comprises:
selecting N hypothesis prediction values from the M hypothesis prediction values; and
calculating the template matching prediction value of the current decoding block according to the selected N hypothesis prediction values;
wherein N is a natural number less than or equal to M.

12. The inter-frame prediction decoding method according to claim 11, wherein the number N is predetermined or determined according to template matching distortion cost or the number of the reference frames.

13. The inter-frame prediction decoding method according to claim 11, wherein the step of calculating the template matching prediction value of the current decoding block according to the selected N hypothesis prediction values comprises:
weighted-averaging the selected N hypothesis prediction values of the decoding block to which the matching templates correspond, to calculate the template matching prediction value of the current decoding block.

14. The inter-frame prediction decoding method according to claim 13, wherein the step of weighted-averaging the selected N hypothesis prediction value comprises:
calculating a sum of products of the selected N hypothesis prediction values of the decoding block to which the matching templates correspond and N weighting factors.

15. The inter-frame prediction decoding method according to claim 14, wherein the weighting factors are determined by distortions between the template region of the current decoding block and each of the N matching templates in the L reference frames calculated according to a cost function.

16. The inter-frame prediction decoding method according to claim 9, further comprising: when the template region of the current decoding block is incomplete, using a template matching prediction value of a decoding block adjacent to the current decoding block as a reconstruction value, so that the decoding block adjacent to the current decoding block becomes a part of the template region of the current decoding block.

17. An inter-frame prediction encoding device, comprising:
a vector determining module configured for calculating distortions between a template region of a current encoding block and each of M matching templates in L reference frames, to determine M offset vectors;
a prediction value calculating module configured for obtaining M hypothesis prediction values of the encoding block to which the M matching templates correspond according to the M offset vectors determined by the vector determining module, and calculating a template matching prediction value of the current encoding block according to the M hypothesis prediction values; and
an encoding module configured for comparing the template matching prediction value with an original value of the current encoding block after the prediction value calculating module calculates the template matching prediction value of the current encoding block, obtaining a residual of the current encoding block, and encoding the residual;
wherein L and M are natural numbers greater than 1.

18. The inter-frame prediction encoding device according to claim 17, wherein the prediction value calculating module comprises:
a selecting sub-module configured for selecting N hypothesis prediction values from the M hypothesis prediction values; and
a calculating sub-module configured for weighted-averaging the N hypothesis prediction values, selected by the selecting sub-module, of the encoding block to which the matching templates correspond, to calculate the template matching prediction value of the current encoding block;
wherein N is a natural number less than or equal to M.

19. The inter-frame prediction encoding device according to claim 18, wherein the number N is predetermined or determined according to template matching distortion costs or the number of the reference frames.

20. An inter-frame prediction decoding device, comprising:
a vector determining module configured for calculating distortions between a template region of a current decoding block and each of M matching templates in L reference frames, to determine M offset vectors;
a prediction value calculating module configured for obtaining M hypothesis prediction values of the decoding block to which the M matching templates correspond according to the M offset vectors determined by the vector determining module, and calculating a template matching prediction value of the current decoding block according to the M hypothesis prediction values; and
a decoding module configured for decoding a residual of the current decoding block, and adding the decoded residual of the current decoding block to the template matching prediction value of the current decoding block to obtain a reconstruction value of the current decoding block;
wherein L and M are natural numbers greater than 1.

21. The inter-frame prediction decoding device according to claim 20, wherein the prediction value calculating module comprises:
a selecting sub-module configured for selecting N hypothesis prediction values from the M hypothesis prediction values; and
a calculating sub-module configured for weighted-averaging the N hypothesis prediction values, selected by the selecting sub-module, of the decoding block to which the matching templates correspond, to calculate the template matching prediction value of the current decoding block;
wherein N is a natural number less than or equal to M.

22. The inter-frame prediction decoding device according to claim 21, wherein the number N is predetermined or determined according to template matching distortion costs or the number of the reference frames.

* * * * *